US010698482B2

(12) United States Patent
Miettinen et al.

(10) Patent No.: US 10,698,482 B2
(45) Date of Patent: Jun. 30, 2020

(54) GAZE TRACKING USING NON-CIRCULAR LIGHTS

(71) Applicant: Varjo Technologies Oy, Helsinki (FI)

(72) Inventors: Ville Miettinen, Helsinki (FI); Klaus Melakari, Oulu (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 16/240,974

(22) Filed: Jan. 7, 2019

(65) Prior Publication Data

US 2019/0138094 A1 May 9, 2019

Related U.S. Application Data

(63) Continuation-in-part of application No. 15/648,886, filed on Jul. 13, 2017, now abandoned, which is a continuation-in-part of application No. 15/366,424, filed on Dec. 1, 2016, now Pat. No. 9,711,072.

(51) Int. Cl.
*G06F 3/01* (2006.01)
*G06K 9/00* (2006.01)
*G02B 27/01* (2006.01)
*G02B 27/00* (2006.01)

(52) U.S. Cl.
CPC ......... *G06F 3/013* (2013.01); *G02B 27/0093* (2013.01); *G02B 27/017* (2013.01); *G06K 9/00604* (2013.01); *G02B 2027/0138* (2013.01); *G02B 2027/0187* (2013.01)

(58) Field of Classification Search
CPC ........................................................ G06F 3/13
USPC ............................................................ 348/158
See application file for complete search history.

(56) References Cited

U.S. PATENT DOCUMENTS

| | | | | |
|---|---|---|---|---|
| 2013/0169683 A1* | 7/2013 | Perez | ..................... | G02B 27/02 345/633 |
| 2013/0176533 A1* | 7/2013 | Raffle | ..................... | A61B 3/113 351/209 |
| 2014/0232638 A1* | 8/2014 | Choi | ....................... | G06F 3/013 345/156 |
| 2014/0375790 A1* | 12/2014 | Robbins | ............. | G02B 27/0172 348/78 |
| 2015/0085250 A1* | 3/2015 | Larsen | ..................... | A61B 3/14 351/206 |

(Continued)

*Primary Examiner* — Joseph G Ustaris
*Assistant Examiner* — Amir Shahnami
(74) *Attorney, Agent, or Firm* — Ziegler IP Law Group LLC

(57) ABSTRACT

Disclosed is gaze-tracking system for head-mounted display apparatus, the gaze-tracking system including a plurality of non-circular light sources that emit light for illuminating a user's eye when the display apparatus is worn by user, at least one camera, and a processor. The processor is configured to control the at least one camera to capture an image of user's eye and reflections of the plurality of non-circular light sources from user's eye; identify at least one of the plurality of non-circular light sources from where at least one of the reflections originated, based upon shapes, rotational orientations and relative positions of the reflections of the plurality of non-circular light sources, to differentiate said reflections from visual artifacts; and detect a gaze direction of user based upon a relative position of a pupil of user's eye with respect to the reflections of the plurality of non-circular light sources.

17 Claims, 5 Drawing Sheets

(56) References Cited

U.S. PATENT DOCUMENTS

2016/0131912 A1* 5/2016 Border ............... G02B 27/0176
345/8

* cited by examiner

GAZE TRACKING USING NON-CIRCULAR LIGHTS

CROSS-REFERENCE TO RELATED APPLICATIONS

This application is a continuation-in-part of U.S. patent application Ser. No. 15/648,886, titled "GAZE-TRACKING SYSTEM AND METHOD OF TRACKING USER'S GAZE" and filed on Jul. 13, 2017, which is incorporated herein by reference. Furthermore, the U.S. patent application Ser. No. 15/648,886 is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, which is also incorporated herein by reference.

TECHNICAL FIELD

The present disclosure relates generally to gaze-tracking systems; and more specifically, to gaze-tracking systems for use in head-mounted display apparatuses, such gaze-tracking systems comprising non-circular light sources, cameras and processors. Moreover, the present disclosure also relates to methods of tracking a user's gaze via the aforementioned gaze-tracking systems.

BACKGROUND

Nowadays, technologies such as virtual reality, augmented reality, and so forth, for presenting a simulated environment (or a simulated world) to a user are being widely used. Typically, the user uses a specialized device (for example, such as a virtual reality device, an augmented reality device, and the like) for experiencing such a simulated environment. In use, the user generally wears (namely, supports) the specialized device on his/her head.

Nowadays, such specialized devices often employ gaze-tracking (namely, eye tracking) equipment to determine a gaze direction of the user. Typically, such gaze-tracking equipment determines a position of pupils of the user's eyes, and subsequently monitors change in the position of the pupils. Generally, in the gaze-tracking equipment, several illuminators are employed for emitting light towards the user's eyes, and a camera is employed for capturing an image depicting the user's eyes and reflections of the emitted light from the user's eyes. Thereafter, the reflections of the emitted light are used as reference for determining the position of the pupils.

However, there exist a number of limitations associated with such gaze-tracking equipment. Firstly, while using the specialized device, a portion of the user's eyes is often occluded by the user's eyelids (for example, when the user blinks or squints his/her eyes). In such an instance, some of the reflections are absent since some emitted light is not reflected by the surface of the user's eyes. Such absence of some reflections leads to inaccuracies in determining the position of the pupils of the user's eyes. Secondly, existing gaze-tracking equipment often misinterprets visual artifacts (for example, reflections of light emitted by image renderers of the specialized devices, false reflections of light from eyeglasses of the user, false reflections of light from a wet surface of the user's eyes) to be the reflections of the light emitted by the illuminators. In such a case, the gaze-tracking equipment utilizes such erroneous visual artifacts and determines an inaccurate gaze direction of the user.

Therefore, in light of the foregoing discussion, there exists a need to overcome the aforementioned drawbacks associated with conventional gaze-tracking equipment.

SUMMARY

The present disclosure seeks to provide a gaze-tracking system for use in a head-mounted display apparatus. The present disclosure also seeks to provide a method of tracking a user's gaze, via a gaze-tracking system of a head-mounted display apparatus. The present disclosure seeks to provide a solution to the existing problem of inaccurate gaze detection due to occlusion of the user's eyes and presence of visual artifacts in an image of the user's eyes. An aim of the present disclosure is to provide a solution that overcomes at least partially the problems encountered in prior art, and provides a reliable, efficient and highly accurate gaze-tracking system for use in the head-mounted display apparatus.

In one aspect, an embodiment of the present disclosure provides a gaze-tracking system for use in a head-mounted display apparatus, the gaze-tracking system comprising:
a plurality of non-circular light sources that, in operation, emit light for illuminating a user's eye when the head-mounted display apparatus in operation is worn by the user;
at least one camera; and
a processor configured to:
control the at least one camera to capture an image of the user's eye and reflections of the plurality of non-circular light sources from the user's eye;
identify at least one of the plurality of non-circular light sources from where at least one of the reflections originated, based upon shapes, rotational orientations and relative positions of the reflections of the plurality of non-circular light sources, to differentiate said reflections from visual artifacts; and
detect a gaze direction of the user based upon a relative position of a pupil of the user's eye with respect to the reflections of the plurality of non-circular light sources.

In another aspect, an embodiment of the present disclosure provides a method of tracking a user's gaze, via a gaze-tracking system of a head-mounted display apparatus, the gaze-tracking system comprising a plurality of non-circular light sources and at least one camera, the method comprising:
emitting, via the plurality of non-circular light sources, light for illuminating an eye of the user when the head-mounted display apparatus in operation is worn by the user;
capturing, via the at least one camera, an image of the user's eye and reflections of the plurality of non-circular light sources from the user's eye;
identifying at least one of the plurality of non-circular light sources from where at least one of the reflections originated, based upon shapes, rotational orientations and relative positions of the reflections of the plurality of non-circular light sources, to differentiate said reflections from visual artifacts; and
detecting a gaze direction of the user based upon a relative position of a pupil of the user's eye with respect to the reflections of the plurality of non-circular light sources.

Embodiments of the present disclosure substantially eliminate or at least partially address the aforementioned problems in the prior art, and enable accurate tracking of the user's gaze by way of the gaze-tracking system.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
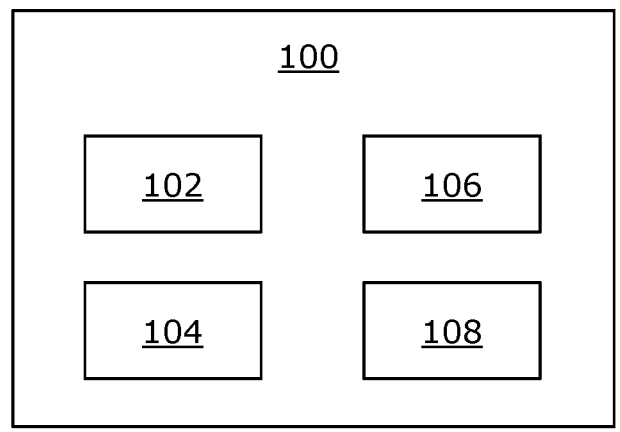
FIGS. 1 and 2 are block diagrams of architectures of a gaze-tracking system for use in a head-mounted display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:
a plurality of non-circular light sources that, in operation, emit light for illuminating a user's eye when the head-mounted display apparatus in operation is worn by the user;
at least one camera; and
a processor configured to:
control the at least one camera to capture an image of the user's eye and reflections of the plurality of non-circular light sources from the user's eye;
identify at least one of the plurality of non-circular light sources from where at least one of the reflections originated, based upon shapes, rotational orientations and relative positions of the reflections of the plurality of non-circular light sources, to differentiate said reflections from visual artifacts; and
detect a gaze direction of the user based upon a relative position of a pupil of the user's eye with respect to the reflections of the plurality of non-circular light sources.

In another aspect, an embodiment of the present disclosure provides a method of tracking a user's gaze, via a gaze-tracking system of a head-mounted display apparatus, the gaze-tracking system comprising a plurality of non-circular light sources and at least one camera, the method comprising:
emitting, via the plurality of non-circular light sources, light for illuminating an eye of the user when the head-mounted display apparatus in operation is worn by the user;
capturing, via the at least one camera, an image of the user's eye and reflections of the plurality of non-circular light sources from the user's eye;
identifying at least one of the plurality of non-circular light sources from where at least one of the reflections originated, based upon shapes, rotational orientations and relative positions of the reflections of the plurality of non-circular light sources, to differentiate said reflections from visual artifacts; and
detecting a gaze direction of the user based upon a relative position of a pupil of the user's eye with respect to the reflections of the plurality of non-circular light sources.

The present disclosure provides the aforementioned gaze-tracking system and the aforementioned method of tracking the user's gaze. The gaze-tracking system utilizes the plurality of non-circular light sources for emitting light to illuminate the user's eye. As a result, the reflections of such light sources have shapes, rotational orientations and relative positions corresponding to the plurality of non-circular light sources. This allows for accurately identifying light sources from where the reflections originated, in order to accurately differentiate the reflections from visual artifacts. The gaze-tracking system omits such visual artifacts to detect a highly accurate gaze direction of the user. Beneficially, the gaze-tracking system can be utilized for accurately determining the gaze direction of the user even when the user's eye is partially occluded. Moreover, the gaze-tracking system can be easily used in various types of head-mounted display apparatuses without obstructing the user's view.

Throughout the present disclosure, the term "head-mounted display apparatus" refers to specialized equipment that is configured to present a simulated environment to the user when the display apparatus in operation is worn by the user on his/her head. In such an instance, the display apparatus acts as a device (for example, such as a virtual reality headset, a pair of virtual reality glasses, an augmented reality headset, a pair of augmented reality glasses, a mixed reality headset, a pair of mixed reality glasses, and so forth) that is operable to present a visual scene of the simulated environment to the user. The head-mounted display apparatus may also simply be referred to as "display apparatus".

It will be appreciated that the visual scene of the simulated environment comprises a sequence of images. As an example, the visual scene may be a virtual reality movie. As another example, the visual scene may be an educational augmented reality video. As yet another example, the visual scene may be a mixed reality game.

Throughout the present disclosure, the term "gaze-tracking system" used herein relates to specialized equipment for detecting a direction of gaze (namely, a gaze direction) of the user. The head-mounted display apparatus uses the gaze-tracking system for determining the gaze direction of the user via non-invasive techniques. Beneficially, the gaze-tracking system is arranged in a manner that it does not cause any obstruction in the user's view. Moreover, an accurate detection of the gaze direction facilitates the head-mounted display apparatus to closely implement gaze contingency.

It is to be understood that the gaze-tracking system may also be referred to as an "eye-tracker system", a "means for detecting a gaze direction", a "means for tracking a gaze direction", or a "gaze-tracking unit".

Throughout the present disclosure, the term "light source" refers to equipment that, in operation, emits light. Examples of such light sources include, but are not limited to, light-emitting diodes, projectors, displays, and lasers. By "non-circular light source", it is meant that the light source has a non-circular shape.

Optionally, a given non-circular light source has a shape that is symmetrical about only one axis and that has rotational uniqueness about 360 degrees. In other words, a shape of the given non-circular light source is symmetrical about only one axis and such shape only repeats when said light source is rotated through 360 degrees. This allows for a reflection of the given non-circular light source (namely, a given non-circular glint) to be rotatably discernible to correspond to the given non-circular light source, based upon the shape of the reflection.

It will be appreciated that the reflections of the plurality of non-circular light sources (namely, the plurality of non-circular glints) are substantially symmetrical about only one axis. Said reflections are "substantially symmetrical", since the shape of the given non-circular glint not only depends on the shape of its corresponding non-circular light source, but also on a curvature of a surface of the user's eye from where the reflection occurred.

More optionally, the shape of the given non-circular light source is selected from the group consisting of A, V and Y. Alternatively, optionally, the shape of the given non-circular light source is selected from the group consisting of B, C, D, E, M, T, U and W. It will be appreciated that the shape of the given non-circular light source need not necessarily be an alphabetic character, but could also be a number or a pattern that is symmetrical about only one axis and that has rotational uniqueness about 360 degrees.

As an example, the given non-circular light source may be V-shaped. In such a case, the V-shape of the given non-circular light source is symmetrical about only one axis, and has rotational uniqueness about 360 degrees. As a result, the reflection of said given non-circular light source can be accurately recognized even upon rotation of the given non-circular light source. For example, when the given non-circular light source is oriented at an angle of 0 degrees, the reflection of said light source is represented as ">". When the given non-circular light source is rotated through 90 degrees in clockwise direction, the reflection of said light source is represented as "V". Similarly, when the given non-circular light source is rotated by 180 degrees and 270 degrees in clockwise direction, the reflection of said light source is represented as "<" and "Λ" respectively. Furthermore, when the given non-circular light source is rotated by 360 degrees, the reflection of said light source is represented as ">" which is similar to the original shape of the reflection at 0 degrees.

Optionally, the gaze-tracking system further comprises at least one circular light source that, in operation, emits light for illuminating the user's eye when the head-mounted display apparatus in operation is worn by the user. The at least one circular light source is additional to the plurality of non-circular light sources. Notably, the at least one circular light source has a circular shape that may be either solid or hollow. Furthermore, the at least one circular light source does not have distinct orientations.

As an example, the gaze-tracking system may comprise 7 non-circular light sources and 3 circular light sources. The size of the 3 circular light sources may be smaller than that of the 7 non-circular light sources. As a result, the 3 circular light sources may be arranged in a region of the head-mounted display apparatus that would lie next to a nose of the user when the head-mounted display apparatus is worn by the user on his/her head.

In an embodiment, at least two of the plurality of non-circular light sources have different non-circular shapes. As a result, reflections of such at least two non-circular light sources also have the different non-circular shapes. Therefore, using the captured image, said at least two non-circular light sources corresponding to the reflections having different non-circular shapes can be easily identified, to differentiate said reflections from visual artifacts. Beneficially, such at least two non-circular light sources are easily identifiable due to their different non-circular shapes, and can therefore be utilized for accurately determining the gaze direction of the user even when the user's eye is partially closed.

As an example, the gaze-tracking system may comprise 6 non-circular light sources, wherein 4 of the 6 non-circular light sources are V-shaped, 1 non-circular light source is A-shaped, and 1 non-circular light source is Y-shaped.

In another embodiment, at least two of the plurality of non-circular light sources have a same non-circular shape. In such a case, reflections of the at least two non-circular light sources form a pattern of the same non-circular shape in the captured image. Such a pattern of the same non-circular shape is also useful in differentiating said reflections from the visual artifacts.

Optionally, when the at least two of the plurality of non-circular light sources have the same non-circular shape, the at least two of the plurality of non-circular light sources have different rotational orientations. As a result, reflections of such at least two non-circular light sources also have the same non-circular shape at the different rotational orientations. Therefore, using the captured image, said at least two non-circular light sources corresponding to the reflections having the same non-circular shape but the different rotational orientations can be easily identified, to differentiate said reflections from visual artifacts. Beneficially, such at least two non-circular light sources are easily identifiable due to their different rotational orientations, and can be utilized for accurately determining the gaze direction of the user even when the user's eye is partially closed.

Optionally, a number of the plurality of non-circular light sources lies in a range of 2 non-circular light sources to 20 non-circular light sources. For example, the number of the plurality of non-circular light sources may be from 2, 3, 4, 5, 6, 7, 8, 9, 10, 11, 12, 13, 14, 15, 16, 17, 18 or 19 non-circular light sources up to 3, 4, 5, 6, 7, 8, 9, 10, 11, 12, 13, 14, 15, 16, 17, 18, 19 or 20 non-circular light sources.

Optionally, the processor is configured to divide the plurality of non-circular light sources into a plurality of groups, and to control the plurality of groups to emit light in a predefined manner, based upon a time-division multiplexing rule. In such a case, the processor is configured to control operation of the plurality of non-circular light sources to emit light in the predefined manner. According to the time-division multiplexing rule, at a given time, only light sources of a given group are to be switched on or brightened to emit light whilst light sources of all other group(s) are to be switched off or dimmed to prevent emission of light. Optionally, a given group comprises at least one non-circular light source. As an example, the gaze-tracking system may comprise 6 non-circular light sources S1, S2, S3, S4, S5 and S6 which are divided by the processor into 2 groups G1 and G2, wherein the group G1 comprises the non-circular light sources S1, S3 and S5 whilst the group G2 comprises the non-circular light sources S2, S4 and S6. In such an example, the processor may be configured to control the groups G1 and G2 to emit light in an alternating matter by switching on light sources of only one group at a given time. It will be appreciated that such a time-division multiplexed operation of the plurality of non-circular light sources requires the at least one camera to have a high frame rate in order to properly capture images for each of the plurality of groups during a time period for which a given group emits light.

Alternatively, optionally, the plurality of non-circular light sources emit light continuously when the head-mounted display apparatus in operation is worn by the user.

Yet alternatively, optionally, the gaze-tracking system further comprises a switch to enable the user to control operation of the plurality of non-circular light sources.

Optionally, the emitted light has an infrared wavelength or a near-infrared wavelength. The emitted light of the infrared wavelength or the near-infrared wavelength is invisible to the human eye, thereby, reducing unwanted distraction when such light is incident upon the user's eye. Alternatively, optionally, the emitted light has a visible wavelength.

Optionally, the plurality of non-circular light sources are implemented by way of at least one of: infrared light-emitting diodes, infrared lasers, infrared light projectors, infrared light-emitting diode based displays, visible light-emitting diodes, visible light lasers, visible light projectors.

Throughout the present disclosure, the term "camera" refers to equipment that is operable to detect and process the light reflected from the user's eye, so as to capture the image of the user's eye and the reflections of the plurality of non-circular light sources from the user's eye. Notably, the image is representative of a form of the reflections and a position of the reflections on an image plane of the at least one camera. In particular, the image depicts shapes, rotational orientations and relative positions (namely, intergeometry) of the reflections of the plurality of non-circular light sources.

It will be appreciated that the term "image plane of the at least one camera" generally relates to a region of the at least one camera whereat the reflections of the plurality of non-circular light sources are focused, to create the aforesaid image. In other words, the image plane of the at least one camera is an imaging surface of the at least one camera, and lies within the at least one camera. Optionally, the image plane of the at least one camera is implemented by way of at least one chip comprising a plurality of photo-sensitive elements implemented thereon. Examples of the at least one camera include, but are not limited to, a digital camera, a black-and-white camera, a Red-Green-Blue (RGB) camera, and an Infra-Red (IR) camera. The shapes, rotational orientations and the relative positions of the reflections of the plurality of non-circular light sources from the user's eye, depicted in the captured image, are used to determine a gaze direction of the user's eye.

The processor could be implemented as hardware, software, firmware or a combination of these. The processor is coupled to various components of the gaze-tracking system, and is configured to control the operation of the gaze-tracking system.

Optionally, the processor of the gaze-tracking system is implemented by way of a processor of the head-mounted display apparatus. Alternatively, optionally, the gaze-tracking system and the head-mounted display apparatus have separate processors.

The processor is configured to control the at least one camera to capture the image of the user's eye and reflections of the plurality of non-circular light sources from the user's eye. The image depicts shapes, rotational orientations and the relative positions of the reflections of the plurality of non-circular light sources from the user's eye, and is therefore used to determine a gaze direction of the user's eye.

Optionally, the image is also employed to determine a geometry (namely, shape and structure) of the user's eye. It will be appreciated that human eye has an irregular shape, such as a shape that substantially deviates from a perfect sphere. Therefore, the plurality of non-circular light sources are reflected at different angles by different regions of the user's eye. The processor optionally processes the image to determine the geometry of the eye, based upon the orientation and/or size of the reflections of the plurality of non-circular light sources.

The at least one of the plurality of non-circular light sources from where at least one of the reflections originated are identified, based upon shapes, rotational orientations and relative positions of the reflections of the plurality of non-circular light sources, to differentiate said reflections from visual artifacts. Since the shapes, rotational orientations and relative positions of the plurality of non-circular light sources is known, the processor can accurately differentiate the shapes, rotational orientations and relative positions of reflections of said light sources from the visual artifacts. In other words, the processor maps at least one of the reflections depicted in the image to its corresponding light source, to differentiate said reflections from the visual artifacts. Such a manner of differentiating said reflections from visual artifacts can be employed for accurately detecting gaze direction of the user even when the user's eye is partially closed and only some of the reflections are visible in the captured image.

It will be appreciated that a reflection of a given non-circular light source appears in the captured image as a corresponding glint having a shape, rotational orientation and relative position similar to that of the given non-circular light source.

Throughout the present disclosure, the term "visual artifact" refers to undesirable visual anomalies or visual imposters depicted in the image captured by the at least one camera. Such visual artifacts are formed as false reflections of at least one non-circular light source from a wet surface of the user's eye, eyeglasses worn by the user contact lenses worn by the user, and the like.

Optionally, the processor is configured to employ at least one processing algorithm to:
- identify candidate reflections depicted in the image, wherein such candidate reflections comprise the reflections of the plurality of non-circular light sources and the visual artifacts;
- process the candidate reflections to identify and discard visual artifacts among said candidate reflections, based upon at least one predefined parameter;
- map the candidate reflections with known shapes of the plurality of non-circular light sources, to further identify and discard visual artifacts among said candidate reflections;
- determine rotational orientations and relative positions of remaining candidate reflections, wherein the remaining candidate reflections comprise only the reflections of the plurality of non-circular light sources; and
- report the shapes, rotational orientations and relative positions for all the reflections of the plurality of non-circular light sources.

Optionally, to identify the candidate reflections depicted in the image, the processor employs at least one of: a local thresholding algorithm to detect connected shapes that are brighter than their immediate neighbourhood, a de-noising algorithm to remove noise in the image.

Optionally, the at least one predefined parameter for processing the candidate reflections comprises at least one of: width of pixels, height of pixels, number of pixels, distance of a given candidate reflection from the pupil and/or an iris of the user's eye.

Optionally, when mapping the candidate reflections with known shapes of the plurality of non-circular light sources, the at least one algorithm fits known shapes of the plurality of non-circular light sources to the candidate reflections, identifies as visual artifacts those candidate reflections which do not fit with the known shapes of the plurality of non-circular light sources, and discards such identified visual artifacts.

Optionally, when measuring the rotational orientations of the remaining candidate reflections, the at least one processing algorithm measures the orientations of an endpoint of a given candidate reflection to a midpoint vector between edges of the given candidate reflection. Optionally, in such a case, a rotational orientation of an initial candidate reflection is determined to be same as that of a non-circular light source having a similar rotational orientation.

Optionally, when determining the relative positions of the remaining candidate reflections, the at least one processing algorithm calculates distances and angles between the remaining candidate reflections.

The gaze direction of the user is detected based upon the relative position of the pupil of the user's eye with respect to the reflections of the plurality of non-circular light sources. Notably, the reflections of the plurality of non-circular light sources act as a frame of reference against which the relative position of the pupil is calculated to determine the gaze direction of the user. The processor utilizes knowledge of geometry between the reflections of the plurality of non-circular light sources, the plurality of non-circular light sources and the at least one camera to accurately determine the relative position of the pupil of the user's eye with respect to said reflections. As the pupil of the user's eye is oriented along the gaze direction of the user, the determined relative position of the pupil with respect to said reflections enables the processor to correctly discern the gaze direction of the user.

It will be appreciated that clearly differentiating the reflections of the plurality of non-circular light sources from the visual artifacts allows for enhancing an accuracy of the detected gaze direction of the user, since this ensures that the processor does not incorrectly utilize the visual artifacts whilst detecting the gaze direction of the user.

Optionally, the plurality of non-circular light sources are arranged in a substantially circular manner, wherein the reflections of the plurality of non-circular light sources appear in the captured image as a plurality of non-circular glints arranged in a substantially circular manner. The substantially circular pattern formed by the plurality of non-circular glints corresponds to the substantially circular arrangement of the plurality of non-circular light sources. It will be appreciated that such a circular arrangement of the plurality of glints enables the processor to easily and accurately distinguish the reflections of the plurality of non-circular light sources from the visual artifacts. The term "substantially circular" refers to a given shape that approximates a circle within +/−20%, nd more optionally, within +/−5%.

Alternatively, optionally, the plurality of non-circular light sources are arranged in a predefined form, wherein the reflections of the plurality of non-circular light sources appear in the captured image as a plurality of non-circular glints arranged in the predefined form. Such a predefined form could comprise at least one of: a specific shape (for example, such as an elliptical shape, a polygonal shape, and the like), a specific alphabetic character, a specific numeric character, a specific pattern.

Optionally, the processor is configured to identify a polygon defined by the plurality of non-circular glints, and to determine the relative position of the user's pupil with respect to the polygon. Optionally, in this regard, the vertices of the polygon correspond to at least three of the plurality of non-circular glints. Furthermore, optionally, the plurality of glints are substantially reflected from an iris of the user's eye and the polygon is defined around the pupil of the user's eye. It will be appreciated that the polygon acts a frame of reference with well-defined limits for accurately determining the relative position of the user's pupil with respect to the reflections of the plurality of non-circular light sources, and subsequently, for accurately detecting the gaze direction of the user. Notably, the user's pupil may lie at a centre of the polygon, towards a particular region of the polygon, or along a periphery of the polygon. Furthermore, the user's pupil may or may not be fully enclosed by the polygon.

As an example, when reflections of 4 non-circular light sources appear in the captured image as 4 non-circular glints, the processor may identify a quadrilateral defined by the 4 non-circular glints. In such an example, the user's pupil may be determined to lie at a centre of the quadrilateral, thereby indicating that the gaze direction of the user is towards a central region of the visual scene.

As another example, when reflections of 6 non-circular light sources appear in the captured image as 6 non-circular glints, the processor may identify a hexagon defined by the 6 non-circular glints. In such an example, the user's pupil may be determined to lie at a right side region of the hexagon, thereby indicating that the gaze direction of the user is towards a left side region of the visual scene.

Optionally, the processor is configured to use the plurality of non-circular glints as references for a next image, to differentiate reflections of the plurality of non-circular light sources from visual artifacts in the next image. Generally, the user's gaze moves from one direction to another in a gradual manner. In such a case, a location of the plurality of non-circular glints in a given image and its next image (namely, a successive image) may be substantially similar. Therefore, the plurality of non-circular glints can be beneficially used as references for the next image, in order to reduce time required for processing the next image.

Hereinabove, by "substantially similar", it is meant that pixels of a given non-circular glint that is depicted in two consecutive images lie within a radius of the given non-circular glint, as depicted in the two consecutive images. Notably, the radius of the given non-circular glint defines an acceptable range surrounding camera-space origins (namely, imaged locations) of the given non-circular glint. When, in the two consecutive images, the pixels of the given non-circular glint lie within this acceptable range of each other, locations of the given non-circular glint in the two consecutive images are determined to be "substantially similar". Optionally, the radius of the given non-circular glint is computed as an average intensity-weighted distance of all pixels belonging to the given non-circular glint relative to a centre of mass of the given non-circular glint. Alternatively, optionally, the radius of the given non-circular glint is computed using a bounding rectangle or a bounding radius of the given non-circular glint. In both alternatives, the radius of the given non-circular light source is computed as a relative number of pixels instead of an absolute number of pixels. As an example, the radius of the given non-circular light source may be calculated as 10 pixels. It will be appreciated that such a manner of determining location similarity of the given non-circular glint is camera resolution independent and projection scale independent. In other words, the radius of the given non-circular glint can be computed in the aforesaid manner, even when the resolution of the at least one camera or the distance of the at least one camera from the user's eye is changed.

Optionally, when using the plurality of non-circular glints as references for the next image, the processor employs at least one image processing algorithm to process a sequence of images captured by the at least one camera. The at least one image processing algorithm provides an incremental tracking solution which monitors the plurality of non-circular glints depicted in consecutive images of the sequence to differentiate reflections of the plurality of non-circular light sources from visual artifacts in the next image. The sequence of images acts as a timeline of frames depicting the plurality of non-circular glints in the user's eye for a given period of time. It will be appreciated that the at least one image processing algorithm can be efficiently employed in instances where very few glints (for example, such as 1 or 2 glints) are visible in a given image, since such glints can be reliably determined to be formed by non-circular light sources using processing data of a previous image. As an example, the glints depicted in the given image can be compared with glints depicted in its previous image, and a given glint can be determined to have originated from a given non-circular light source when positions of the given glint in the given image and the previous image lie in a vicinity of each other.

As an example, a given image of the sequence of images may depict 6 glints. When the sequence of images is processed by the at least one image processing algorithm, the 6 glints can be understood to form a circle of trust with each other. In a next image of the sequence, a new glint can join the circle of trust if each of the previous 6 glints validate its identity. Members of the circle of trust are tracked incrementally in successive images using the at least one image processing algorithm. In such an example, the circle of trust may exist as long as at least one of its members is visible in a current image of the sequence. When the current image does not depict any glint (for example, when the user blinks his/her eye), the circle of trust may be dissolved. The circle of trust may again be formed when a current image of the sequence depicts 6 or more glints.

Optionally, the plurality of non-circular light sources are arranged around a periphery of an exit optical element of the head-mounted display apparatus. In such a case, the plurality of non-circular light sources are arranged to physically surround the exit optical element. It will be appreciated that an optical path of the light emitted by said arrangement of the plurality of non-circular light sources is unobstructed by other components of the head-mounted display apparatus, and is therefore directly incident upon the user's eye.

In an embodiment, the plurality of non-circular light sources are arranged around a boundary of the exit optical element. In another embodiment, the plurality of non-circular light sources are arranged on a hardware component that surrounds the periphery of the exit optical element.

Throughout the present disclosure, the term "exit optical element" refers to an optical component that is configured to direct a projection of the visual scene towards the user's eye, when the head-mounted display apparatus in operation is worn by the user. Notably, the exit optical element is the component that is closest to the user's eye in the head-mounted display apparatus. Therefore, the term "exit optical element" may also be commonly referred to as an "eyepiece".

Optionally, when the shape of the exit optical element is substantially circular and the plurality of non-circular light sources are arranged around the periphery of the exit optical element, the plurality of non-circular light sources are arranged in the substantially circular manner.

Optionally, the gaze-tracking system further comprises at least one optical element that is substantially transparent for visible light, but is substantially reflective for infrared or near-infrared light, wherein the at least one optical element is positioned on an optical path between at least one image renderer of the head-mounted display apparatus and the exit optical element, and wherein the reflections of the plurality of non-circular light sources, when incident upon the at least one optical element, are reflected towards the at least one camera.

Herein, the term "at least one optical element" refers to at least one optical component having optical properties such that said at least one optical component is substantially transparent for visible light, but is substantially reflective for infrared or near-infrared light. Notably, the at least one optical element allows the visible light emanating from the at least one image renderer to pass therethrough towards the exit optical element. Furthermore, the at least one optical element reflects the reflections of the plurality of non-circular light sources from the user's eye towards the at least one camera. By adjusting the optical path of the reflections of the plurality of non-circular light sources, the at least one optical element allows the at least one camera to capture the image of the user's eye and reflections of the plurality of non-circular light sources from the user's eye even when the at least one camera is not directly arranged in front of the user's eye. As a result, the at least one camera can be compactly arranged in any suitable space within the head-mounted display apparatus, and need not necessarily face the user's eye. It will be appreciated that use of the at least one optical element also allows for reducing unwanted visible light from being captured by the at least one camera.

Optionally, the at least one optical element is implemented by way of at least one of: a semi-transparent mirror, a semi-transparent film, a prism, a polarizer, an optical waveguide.

Throughout the present disclosure, the term "image renderer" refers to equipment that, when operated, renders the sequence of images (of the visual scene).

Optionally, the at least one image renderer is implemented as at least one display. Optionally, the at least one display is selected from the group consisting of: a Liquid Crystal Display (LCD), a Light Emitting Diode (LED)-based display, an Organic LED (OLED)-based display, a micro OLED-based display, a Liquid Crystal on Silicon (LCoS)-based display, a Cathode Ray Tube (CRT)-based display.

Optionally, the at least one image renderer is implemented as at least one projector and a projection screen associated therewith. Optionally, the at least one projector is selected from the group consisting of: an LCD-based projector, an LED-based projector, an OLED-based projector, an LCoS-based projector, a Digital Light Processing (DLP)-based projector, and a laser projector.

Optionally, the at least one image renderer comprises at least a first image renderer and at least a second image renderer that, in operation, render a first image and a second image, respectively, wherein the processor of the head-mounted display apparatus is configured to:

receive the detected gaze direction of the user from the gaze-tracking system;

process an input image to be displayed to the user of the head-mounted display apparatus, and use the detected gaze direction of the user to determine a region of visual accuracy of the input image;

process the input image to generate the first image and the second image, the first image having a first image resolution and the second image having a second image resolution, wherein:

a region of the first image that substantially corresponds to the region of visual accuracy of the input image is masked, the second image substantially corresponds to the region of visual accuracy of the input image, and the second image resolution is higher than the first image resolution; and render the first image at the at least one first image renderer and the second image at the at least one second image renderer substantially simultaneously, whist controlling at least one optical combiner to combine a projection of the rendered first image with a projection of the rendered second image in a manner that the projection of the rendered second image substantially overlaps the projection of the masked region of the rendered first image.

Optionally, an angular width of the first image lies in a range of 40 degrees to 220 degrees, while an angular width of the second image lies in a range of 5 degrees to 60 degrees. For example, the angular width of the first image may be from 40, 50, 60, 70, 80, 90, 100, 110, 120, 130, 140, 150, 160, 170, 180, 190, 200 or 210 degrees up to 50, 60, 70, 80, 90, 100, 110, 120, 130, 140, 150, 160, 170, 180, 190, 200, 210 or 220 degrees. Likewise, the angular width of the second image may be from 5, 10, 15, 20, 25, 30, 35, 40, 45, 50 or 55 degrees up to 10, 15, 20, 25, 30, 35, 40, 45, 50, 55 or 60 degrees. Herein, the term "angular width" refers to an angular width of a given image with respect to the perspective of the user's eye, namely with respect to a centre of the user's gaze. It will be appreciated that the angular width of the first image is larger than the angular width of the second image.

Throughout the present disclosure, the term "region of visual accuracy" of the input image refers to a region of interest within the input image whereat the gaze direction of the user is directed (namely, focused) when the user views the input image. In other words, the region of interest is a fixation region within the input image.

Throughout the present disclosure, the term "image resolution" refers to a detail a given image holds (see reference: https://en.wikipedia.org/wiki/Image_resolution). The image resolution is typically measured as the number of pixel values per unit area associated with the given image. As an example, if the first and second images have 'X' and 'Y' pixel values per unit area, respectively, then 'Y' would be greater than 'X' (namely, Y>X).

Optionally, when the aforesaid masking operation is performed, the region of visual accuracy depicted within the first image is obscured. Therefore, an image that is visible to the user depicts the region of interest of the input image by utilizing only the second image. Optionally, the masking operation is performed by dimming or darkening (for example, blackening) pixels of the region of visual accuracy in the first image.

Throughout the present disclosure, the term "optical combiner" refers to equipment (for example, such as optical components) for optically combining the projection of the rendered first image with the projection of the rendered second image. Optionally, the at least one optical combiner is implemented by way of at least one of: a lens, a mirror, a semi-transparent mirror, a semi-transparent film, a semi-transparent flexible membrane, a prism, a beam splitter, an optical waveguide, a polarizer.

Throughout the present disclosure, the term "projection of the given image" refers to a collection of light rays emanating from a given image renderer when the given image is rendered thereat. The projection of the given image (namely, the collection of light rays) may transmit through and/or reflect from various other components of the head-mounted display apparatus before reaching the user's eye. For purposes of embodiments of the present disclosure, the term "projection of the given image" has been used consistently, irrespective of whether the collection of light rays is transmitted or reflected.

Optionally, the processor is configured to calibrate the gaze-tracking system by (i) determining an initial position and/or orientation of the head-mounted display apparatus with respect to the user's eye, whilst capturing an initial image of the user's eye using the at least one camera, (ii) storing information indicative of the initial position and/or orientation with respect to the shapes, rotational orientations and relative positions of the reflections of the plurality of non-circular light sources in the captured initial image, (iii) capturing, at a later time, a subsequent image of the user's eye using the at least one camera, and (iv) determining a change in the position and/or orientation of the head-mounted display apparatus with respect to the user's eye, based upon a change in the shapes, rotational orientations and relative positions of the reflections of the plurality of non-circular light sources between the subsequent image and the initial image.

Moreover, the present disclosure also relates to the method as described above. Various embodiments and variants disclosed above, with respect to the aforementioned first aspect, apply mutatis mutandis to the method.

Optionally, the plurality of non-circular light sources are arranged in a substantially circular manner, wherein the reflections of the plurality of non-circular light sources appear in the captured image as a plurality of non-circular glints arranged in a substantially circular manner.

Optionally, the method further comprises:
identifying a polygon defined by the plurality of non-circular glints; and
determining the relative position of the user's pupil with respect to the polygon.

Optionally, the method further comprises using the plurality of non-circular glints as references for a next image, to differentiate reflections of the plurality of non-circular light sources from visual artifacts in the next image.

Optionally, a given non-circular light source has a shape that is symmetrical about only one axis and that has rotational uniqueness about 360 degrees.

Optionally, the method further comprises:
dividing the plurality of non-circular light sources into a plurality of groups; and
controlling the plurality of groups to emit light in a predefined manner, based upon a time-division multiplexing rule.

DETAILED DESCRIPTION OF THE DRAWINGS

Referring to FIG. 1, illustrated is a block diagram of architecture of a gaze-tracking system 100 for use in a head-mounted display apparatus (not shown), in accordance with an embodiment of the present disclosure. The gaze-tracking system 100 comprises a plurality of non-circular light sources (depicted as two non-circular light sources 102 and 104), at least one camera (depicted as a camera 106) and a processor 108.

The plurality of non-circular light sources 102 and 104, in operation, emit light for illuminating a user's eye when the head-mounted display apparatus in operation is worn by the user.

The processor 108 is configured to:
control the at least one camera 106 to capture an image of the user's eye and reflections of the plurality of non-circular light sources 102 and 104 from the user's eye;
identify at least one of the plurality of non-circular light sources 102 and 104 from where at least one of the reflections originated, based upon shapes, rotational orientations and relative positions of the reflections of the plurality of non-circular light sources 102 and 104 to differentiate said reflections from visual artifacts; and
detect a gaze direction of the user based upon a relative position of a pupil of the user's eye with respect to the reflections of the plurality of non-circular light sources 102 and 104.

FIG. 1 is merely an example, which should not unduly limit the scope of the claims herein. It is to be understood that the specific designation for the gaze-tracking system 100 is provided as an example and is not to be construed as limiting the gaze-tracking system 100 to specific numbers or types of non-circular light sources, cameras and processors. A person skilled in the art will recognize many variations, alternatives, and modifications of embodiments of the present disclosure.

Figure 2:
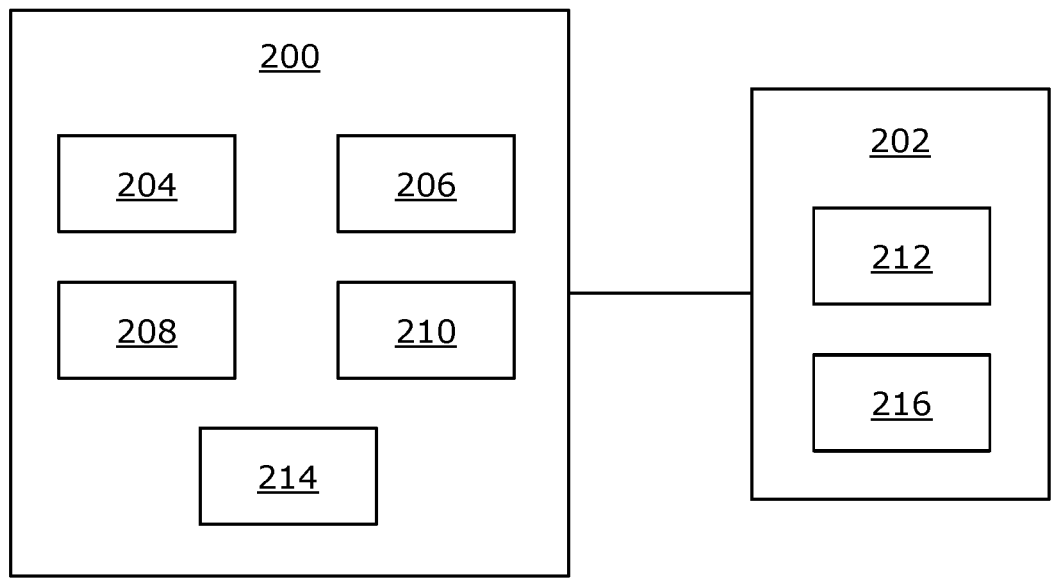

Referring to FIG. 2, illustrated is a block diagram of architecture of a gaze-tracking system 200 for use in a head-mounted display apparatus 202, in accordance with another embodiment of the present disclosure. The gaze-tracking system 200 comprises plurality of non-circular light sources (depicted as two non-circular light sources 204 and 206), at least one camera (depicted as a camera 208) and a processor 210.

The plurality of non-circular light sources 204 and 206 are arranged around a periphery of an exit optical element 212 of the head-mounted display apparatus 202.

The gaze-tracking system 200 further comprises at least one optical element (depicted as an optical element 214) that is substantially transparent for visible light, but is substantially reflective for infrared or near-infrared light. The at least one optical element 214 is positioned on an optical path between at least one image renderer (depicted as an image renderer 216) of the head-mounted display apparatus 202 and the exit optical element 212. The reflections of the plurality of non-circular light sources 204 and 206, when incident upon the at least one optical element 214, are reflected towards the at least one camera 208.

FIG. 2 is merely an example, which should not unduly limit the scope of the claims herein. It is to be understood that the specific designation for the gaze-tracking system 200 is provided as an example and is not to be construed as limiting the gaze-tracking system 200 to specific numbers or types of non-circular light sources, cameras, processors and optical elements. A person skilled in the art will recognize many variations, alternatives, and modifications of embodiments of the present disclosure.

Figure 3A:
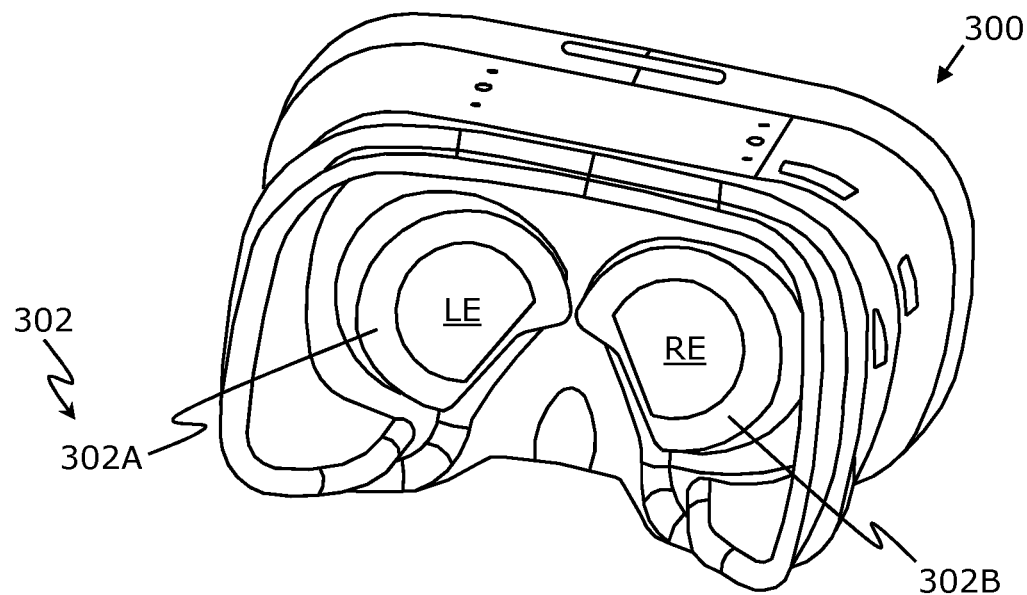
FIG. 3A is a schematic illustration of a head-mounted display apparatus, in accordance with an embodiment of the present disclosure.

Referring to FIG. 3A, illustrated is a schematic illustration of a head-mounted display apparatus 300, in accordance with an embodiment of the present disclosure. The head-mounted display apparatus 300 in operation is worn by the user. The head-mounted display apparatus 300 is shown to comprise an exit optical element 302 (depicted as elements 302A and 302B for a left eye (LE) of the user and a right eye (RE) of the user).

FIG. 3A is merely an example, which should not unduly limit the scope of the claims herein. It is to be understood that the specific designation for the head-mounted display apparatus 300 is provided as an example and is not to be construed as limiting the head-mounted display apparatus 300 to specific shapes, numbers or types of components. A person skilled in the art will recognize many variations, alternatives, and modifications of embodiments of the present disclosure.

Figure 3B:
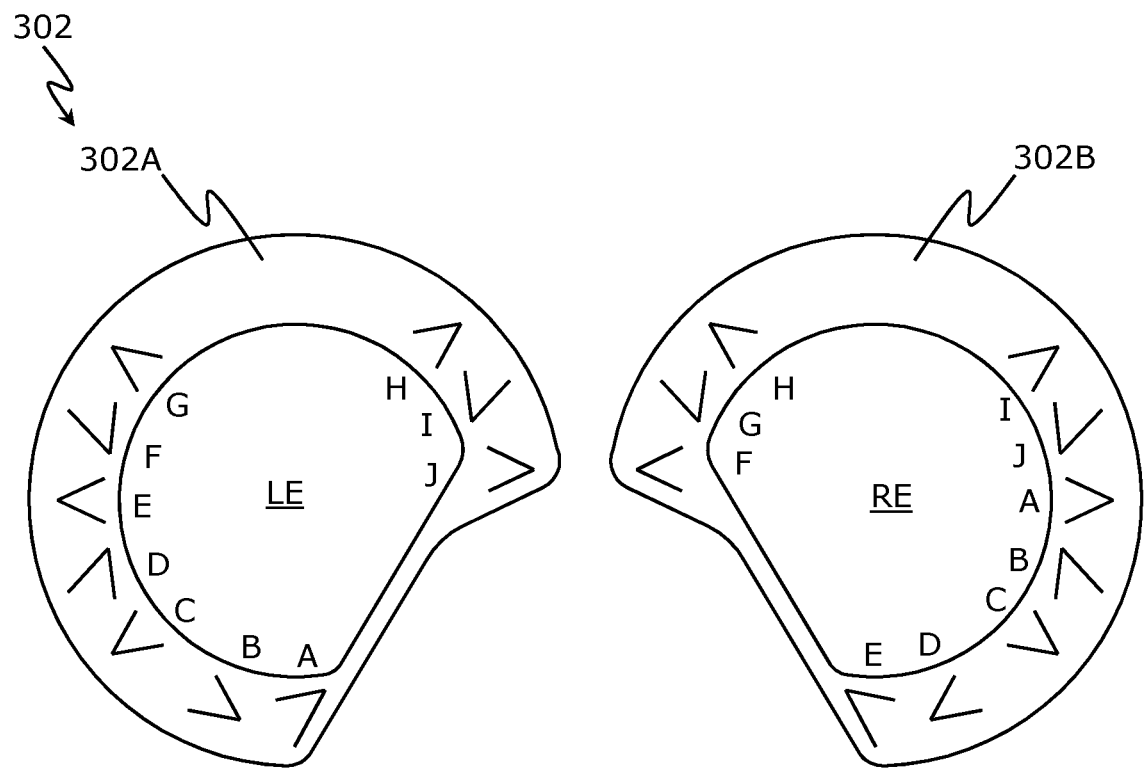
FIGS. 3B and 3C are schematic illustrations of an exit optical element of the head-mounted display apparatus, in accordance with different embodiments of the present disclosure.

FIG. 3B is a schematic illustration of the exit optical element 302 of the head-mounted display apparatus 300, in accordance with an embodiment of the present disclosure. As shown, 10 non-circular light sources A, B, C, D, E, F, G, H, I and J are arranged around a periphery of the exit optical element 302 (and specifically, around a periphery of the elements 302A and 302B) in a substantially circular manner. Furthermore, each non-circular light source has a V shape that is symmetrical about only one axis and that has rotational uniqueness about 360 degrees. Moreover, the 10 non-circular light sources A, B, C, D, E, F, G, H, I and J are depicted to have different rotational orientations.

Here, the "orientation" of a given non-circular light source refers to a direction where the tip of the V shape of the given non-circular light source is pointing. Furthermore, the "position" of a given non-circular light source refers to an angle [0, 360] where the given non-circular light source is positioned on the circular rim of the exit optical element 302, as measured from the centre of said circular rim. For determining the position of the given non-circular light source, a weight centre of said light source is utilized instead of its tip. Notably, an angle system for the orientation of the given non-circular light source may be same as an angle system for the position of the given non-circular light source.

As an example, in case of orientation, ">" points to a 0 degrees angle, "<" points to a 180 degrees angle, "^" points to a 270 degrees angle, and so forth. In such an example, in case of position, the 0 degrees angle corresponds to a right side position, the 90 degrees angle corresponds to a downward position, the 180 degrees angle corresponds to a left side position, and the 270 degrees angle corresponds to an upwards position, and so forth in a clockwise manner with respect to the centre of the circular rim of the exit optical element 302. Exemplary orientations and positions for the 10 non-circular light sources A, B, C, D, E, F, G, H, I and J corresponding to the left eye (LE) of the user and the right eye (RE) of the user are provided in the table below.

| EYE | NAME OF LIGHT SOURCE | ORIENTATION | POSITION | SHAPE |
|-----|-----|-----|-----|-----|
| RE | A | 0 | 0 | V |
| RE | B | 252 | 20.8 | V |
| RE | C | 36 | 40.5 | V |
| RE | D | 144 | 68.2 | V |
| RE | E | 216 | 91.6 | V |
| RE | F | 180 | 188.6 | V |
| RE | G | 72 | 209.8 | V |
| RE | H | 216 | 228.7 | V |
| RE | I | 324 | 319.5 | V |
| RE | J | 108 | 339.2 | V |
| LE | A | 324 | 88.4 | V |
| LE | B | 36 | 111.8 | V |
| LE | C | 144 | 139.5 | V |
| LE | D | 288 | 159.2 | V |
| LE | E | 180 | 180 | V |
| LE | F | 72 | 200.8 | V |
| LE | G | 216 | 220.5 | V |
| LE | H | 324 | 311.3 | V |
| LE | I | 108 | 330.2 | V |
| LE | J | 0 | 351.4 | V |

Figure 3C:
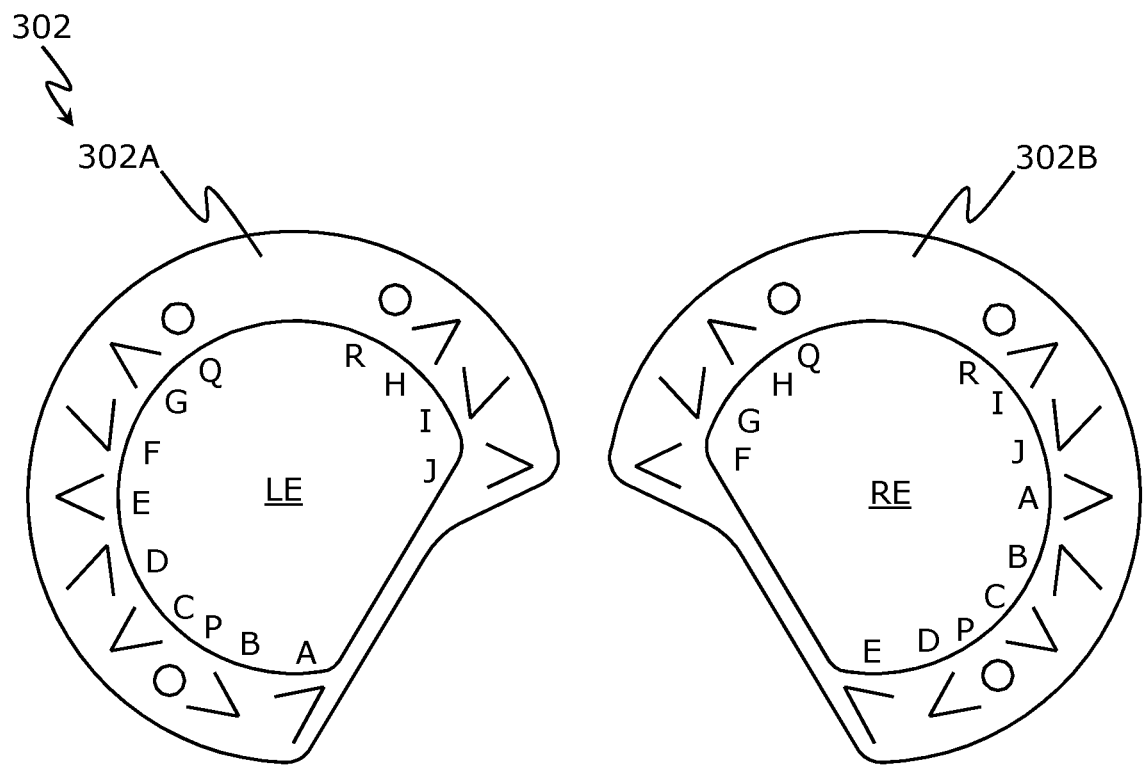

Referring to FIG. 3C, illustrated is a schematic illustration of the exit optical element 302 of the head-mounted display apparatus 300, in accordance with another embodiment of the present disclosure. As shown, 13 non-circular light sources A, B, C, D, E, F, G, H, I, J, P, Q and R are arranged around a periphery of the exit optical element 302 in a substantially circular manner. Notably, the non-circular light sources A, B, C, D, E, F, G, H, I and J have a V shape whereas the non-circular light sources P, Q and R have a circular shape.

FIGS. 3B and 3C are merely examples, which should not unduly limit the scope of the claims herein. It is to be understood that the specific designation for the non-circular light sources A, B, C, D, E, F, G, H, I and J is provided as an example and is not to be construed as limiting the non-circular light sources A, B, C, D, E, F, G, H, I and J to specific numbers, shapes, orientations or positions of the non-circular light sources. A person skilled in the art will recognize many variations, alternatives, and modifications of embodiments of the present disclosure.

Figure 3D:
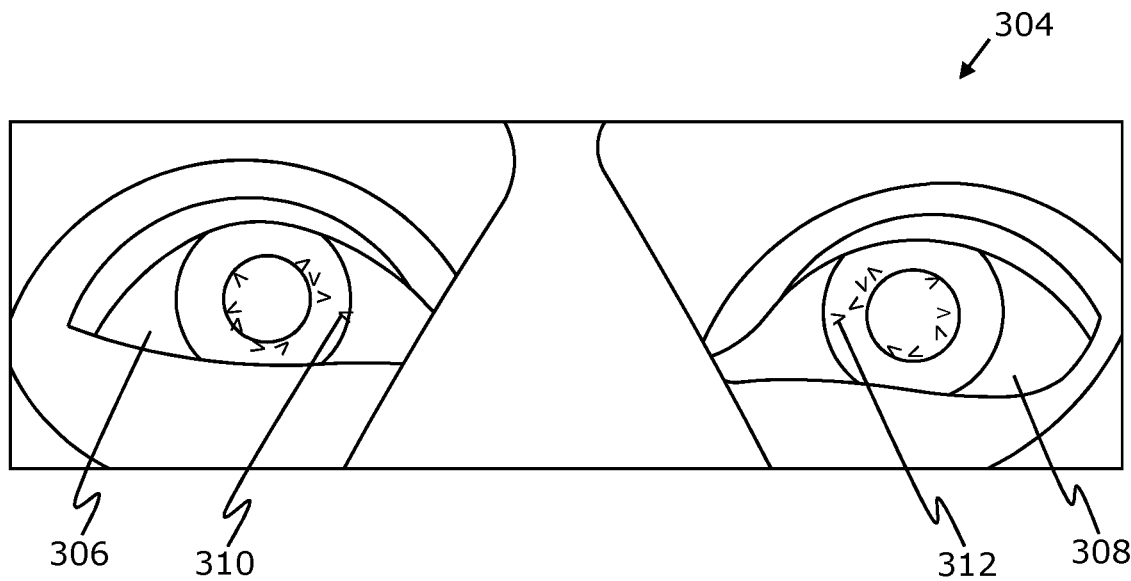
FIG. 3D is a schematic illustration of an image of a user's eyes and reflections of some non-circular light sources from the user's eyes, in accordance with an embodiment of the present disclosure.

FIG. 3D is a schematic illustration of an image 304 of a user's eyes 306 and 308 and reflections of some non-circular light sources from the user's eyes 306 and 308, in accordance with an embodiment of the present disclosure. By way of the image 304, 8 of the 10 non-circular light sources (of FIG. 3B) from where the reflections originated can be identified, based upon shapes, rotational orientations and relative positions of the reflections. This allows for differentiating the reflections of 8 non-circular light sources from visual artifacts 310 and 312.

Figure 3E:
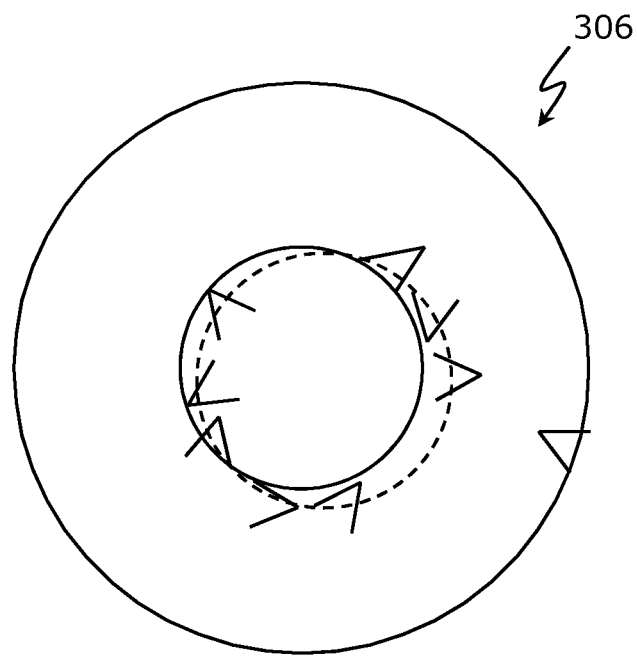
FIGS. 3E and 3F are zoomed-in views of the image of the user's eye depicting a plurality of non-circular glints, in accordance with an embodiment of the present disclosure.
Figure 3F:
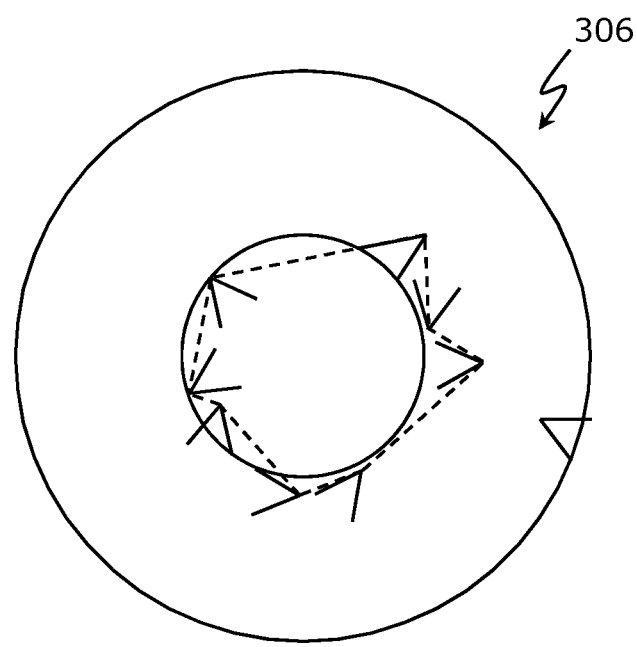

Referring to FIGS. 3E and 3F, illustrated are zoomed-in views of the image of the user's eye 306 depicting a plurality of non-circular glints, in accordance with an embodiment of the present disclosure. In FIGS. 3E and 3F, reflections of 8 non-circular light sources (among the 10 non-circular light sources of FIG. 3B) from the user's eye 306 appear as 8 non-circular glints.

Since the 8 non-circular light sources are arranged in a substantially circular manner (depicted in FIG. 3B), the 8 non-circular glints are arranged in a substantially circular manner. In FIG. 3E, a dashed circle is shown to approximate a shape of the arrangement of the 8 non-circular glints.

Furthermore, as shown in FIG. 3F, the 8 non-circular glints define a polygon (depicted as a dashed polygon). A processor of the gaze-tracking system is configured to identify the polygon defined by the 8 non-circular glints, and to determine the relative position of the user's pupil with respect to the polygon.

FIGS. 3D, 3E and 3F are merely examples, which should not unduly limit the scope of the claims herein. It is to be understood that the specific depiction of the reflections of 8 non-circular light sources is provided as an example and is not to be construed as limiting said reflections to specific numbers, shapes, orientations or positions. A person skilled in the art will recognize many variations, alternatives, and modifications of embodiments of the present disclosure.

Figure 4:
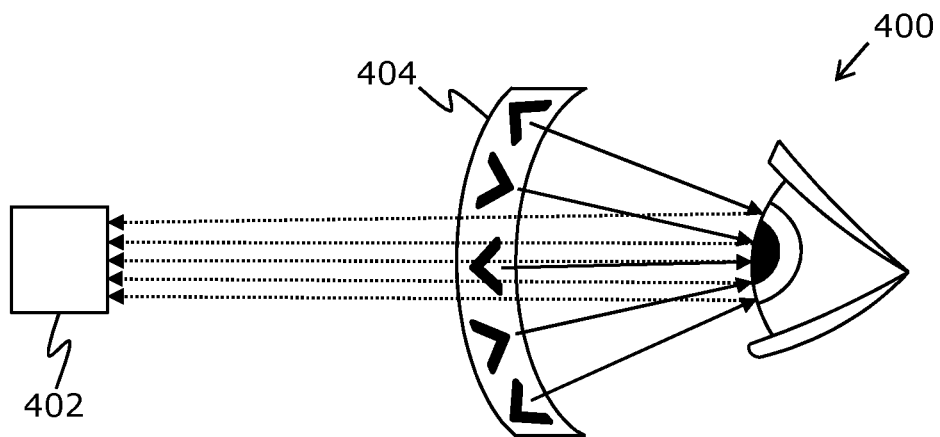
FIG. 4 is a schematic illustration of an exemplary implementation of the gaze-tracking system, in accordance with an embodiment of the present disclosure.

FIG. 4 is a schematic illustration of an exemplary implementation of the gaze-tracking system 400, in accordance with an embodiment of the present disclosure. The gaze-tracking system 400 (for use in a head-mounted display apparatus (not shown)) comprises 5 non-circular light sources, a camera 402, and a processor (not shown). The 5 non-circular light sources, in operation, emit light (depicted as solid arrows) for illuminating a user's eye when the head-mounted display apparatus is worn by the user. The camera 402 captures an image of the user's eye and reflections (depicted as dotted arrows) of the 5 non-circular light sources from the user's eye. The processor is configured to control the camera 402, identify at least one of the 5 non-circular light sources from where at least one of the reflections originated, based upon shapes, rotational orientations and relative positions of the reflections of the 5 non-circular light sources, to differentiate said reflections from visual artifacts, and detect a gaze direction of the user based upon a relative position of a pupil of the user's eye with respect to the reflections of the 5 non-circular light sources.

As shown, the 5 non-circular light sources have a V shape, have different rotational orientations, and are arranged around a periphery of an exit optical element 404 of the head-mounted display apparatus.

FIG. 4 is merely an example, which should not unduly limit the scope of the claims herein. It is to be understood that the specific designation for the gaze-tracking system 400 is provided as an example and is not to be construed as limiting the gaze-tracking system 400 to specific numbers or types of non-circular light sources, cameras and processors. A person skilled in the art will recognize many variations, alternatives, and modifications of embodiments of the present disclosure.

Figure 5:
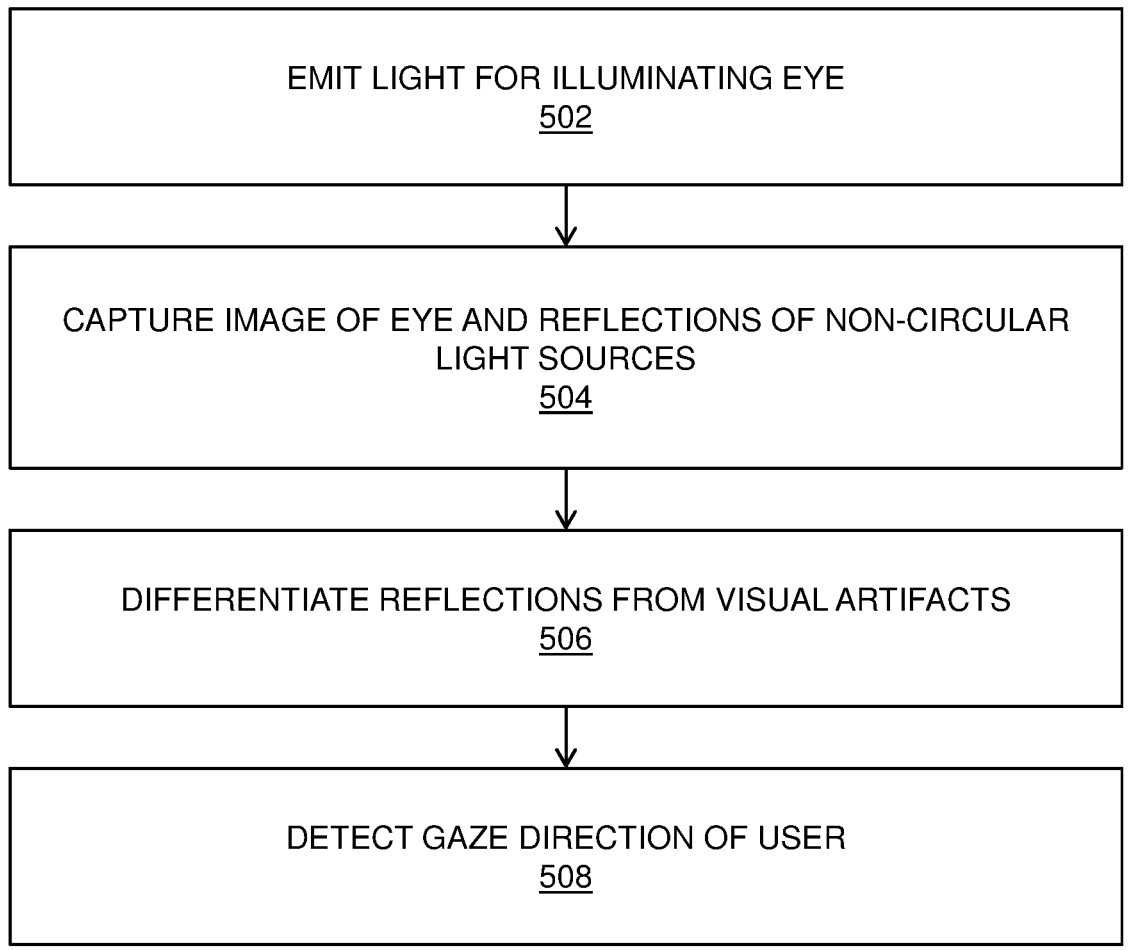
FIG. 5 illustrates steps of a method of tracking a user's gaze, via a gaze-tracking system of a head-mounted display apparatus, in accordance with an embodiment of the present disclosure.

FIG. 5 illustrates steps of a method of tracking a user's gaze, via a gaze-tracking system of a head-mounted display apparatus, in accordance with an embodiment of the present disclosure. The gaze-tracking system comprises a plurality of non-circular light sources and at least one camera.

At a step 502, light for illuminating an eye of the user is emitted, via the plurality of non-circular light sources, when the head-mounted display apparatus in operation is worn by the user.

At a step 504, an image of the user's eye and reflections of the plurality of non-circular light sources from the user's eye is captured, via the at least one camera.

At a step 506, at least one of the plurality of non-circular light sources from where at least one of the reflections originated is identified, based upon shapes, rotational orientations and relative positions of the reflections of the plurality of non-circular light sources, to differentiate said reflections from visual artifacts.

At a step 508, a gaze direction of the user is detected based upon a relative position of a pupil of the user's eye with respect to the reflections of the plurality of non-circular light sources.

The steps 502 to 508 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A gaze-tracking system for use in a head-mounted display apparatus, the gaze-tracking system comprising:
    a plurality of non-circular light sources that, in operation, emit light for illuminating a user's eye when the head-mounted display apparatus in operation is worn by the user;
    at least one camera; and
    a processor configured to:
        control the at least one camera to capture an image of the user's eye and reflections of the plurality of non-circular light sources from the user's eye;
        identify at least one of the plurality of non-circular light sources from where at least one of the reflections originated, based upon shapes, rotational orientations and relative positions of the reflections of the plurality of non-circular light sources, to differentiate said reflections from visual artifacts; and
        detect a gaze direction of the user based upon a relative position of a pupil of the user's eye with respect to the reflections of the plurality of non-circular light sources;
    wherein at least two of the plurality of non-circular light sources have a same non-circular shape and the at least two of the plurality of non-circular light sources have different rotational orientations.

2. The gaze-tracking system of claim 1, wherein the plurality of non-circular light sources are arranged in a substantially circular manner, wherein the reflections of the plurality of non-circular light sources appear in the captured image as a plurality of non-circular glints arranged in a substantially circular manner.

3. The gaze-tracking system of claim 2, wherein the processor is configured to identify a polygon defined by the plurality of non-circular glints, and to determine the relative position of the user's pupil with respect to the polygon.

4. The gaze-tracking system of claim 2, wherein the processor is configured to use the plurality of non-circular glints as references for a next image, to differentiate reflections of the plurality of non-circular light sources from visual artifacts in the next image.

5. The gaze-tracking system of claim 1, wherein a given non-circular light source has a shape that is symmetrical about only one axis and such shape only repeats when the light source is rotated through 360 degrees.

6. The gaze-tracking system of claim 5, wherein the shape of the given non-circular light source is selected from the group consisting of A, V and Y.

7. The gaze-tracking system of claim 1, wherein at least two of the plurality of non-circular light sources have different non-circular shapes.

8. The gaze-tracking system of claim 1, wherein the processor is configured to divide the plurality of non-circular light sources into a plurality of groups, and to control the plurality of groups to emit light in a predefined manner, based upon a time-division multiplexing rule.

9. The gaze-tracking system of claim 1, wherein the emitted light has an infrared wavelength or a near-infrared wavelength.

10. The gaze-tracking system of claim 1, wherein the plurality of non-circular light sources are arranged around a periphery of an exit optical element of the head-mounted display apparatus.

11. The gaze-tracking system of claim 10, further comprising at least one optical element that is substantially transparent for visible light, but is substantially reflective for infrared or near-infrared light, wherein the at least one optical element is positioned on an optical path between at least one image renderer of the head-mounted display apparatus and the exit optical element, and wherein the reflections of the plurality of non-circular light sources, when incident upon the at least one optical element, are reflected towards the at least one camera.

12. A method of tracking a user's gaze, via a gaze-tracking system of a head-mounted display apparatus, the gaze-tracking system comprising a plurality of non-circular light sources and at least one camera, the method comprising:
    emitting, via the plurality of non-circular light sources, light for illuminating an eye of the user when the head-mounted display apparatus in operation is worn by the user;
    capturing, via the at least one camera, an image of the user's eye and reflections of the plurality of non-circular light sources from the user's eye;
    identifying at least one of the plurality of non-circular light sources from where at least one of the reflections originated, based upon shapes, rotational orientations and relative positions of the reflections of the plurality of non-circular light sources, to differentiate said reflections from visual artifacts; and
    detecting a gaze direction of the user based upon a relative position of a pupil of the user's eye with respect to the reflections of the plurality of non-circular light sources,
    wherein at least two of the plurality of non-circular light sources have a same non-circular shape and the at least two of the plurality of non-circular light sources have different rotational orientations.

13. The method of claim 12, wherein the plurality of non-circular light sources are arranged in a substantially circular manner, wherein the reflections of the plurality of non-circular light sources appear in the captured image as a plurality of non-circular glints arranged in a substantially circular manner.

14. The method of claim 13, further comprising:
identifying a polygon defined by the plurality of non-circular glints; and
determining the relative position of the user's pupil with respect to the polygon.

15. The method of claim 13, further comprising using the plurality of non-circular glints as references for a next image, to differentiate reflections of the plurality of non-circular light sources from visual artifacts in the next image.

16. The method of claim 12, wherein a given non-circular light source has a shape that is symmetrical about only one axis and such shape only repeats when the light source is rotated through 360 degrees.

17. The method of claim 12, further comprising:
dividing the plurality of non-circular light sources into a plurality of groups; and
controlling the plurality of groups to emit light in a predefined manner, based upon a time-division multiplexing rule.

* * * * *